US012650595B2

(12) United States Patent　　　　(10) Patent No.:　US 12,650,595 B2
Li et al.　　　　　　　　　　　　　　(45) Date of Patent:　　　Jun. 9, 2026

(54) SMART GLASSES, GLASSES CASE, AND GLASSES ASSEMBLY

(71) Applicant: VIVO MOBILE COMMUNICATION CO., LTD., Dongguan (CN)

(72) Inventors: Lele Li, Dongguan (CN); Ningjie Zheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 712 days.

(21) Appl. No.: 17/982,035

(22) Filed: Nov. 7, 2022

(65) Prior Publication Data

US 2023/0060657 A1　　Mar. 2, 2023

Related U.S. Application Data

(63) Continuation of application No. PCT/CN2021/092312, filed on May 8, 2021.

(30) Foreign Application Priority Data

May 11, 2020　(CN) .......................... 202010396300.1

(51) Int. Cl.
　　*G02B 27/01*　　　(2006.01)
　　*G02C 5/16*　　　(2006.01)
　　*G02C 11/00*　　　(2006.01)
(52) U.S. Cl.
　　CPC ........... *G02B 27/0172* (2013.01); *G02C 5/16* (2013.01); *G02C 11/10* (2013.01); *G02B 2027/0178* (2013.01)

(58) Field of Classification Search
　　CPC ........ G02B 27/0172; G02B 2027/0178; G02B 2027/015; G02B 27/0176; G02C 5/16; (Continued)

(56) References Cited

U.S. PATENT DOCUMENTS 9,482,882 B1 * 11/2016 Hanover ................ G02C 5/146
9,952,452 B1　4/2018 Hanover et al.
(Continued)

FOREIGN PATENT DOCUMENTS

CN　　　2444249　Y　　8/2001
CN　204832706　U　12/2015
(Continued)

OTHER PUBLICATIONS

Machine Translation of WO 2021135724 (Year: 2021).*
(Continued)

*Primary Examiner* — William R Alexander
*Assistant Examiner* — Gabriel A Sanz
(74) *Attorney, Agent, or Firm* — Stites & Harbison, PLLC; Jeffrey A. Haeberlin

(57)　　　　　　ABSTRACT

Smart glasses are disclosed, including a glasses body (100) and temples (200), where the glasses body (100) and the temples (200) are rotatably connected, at least one of the glasses body (100) and the temples (200) is provided with a first electrical connector (300), and the smart glasses include a folded state and an unfolded state; in a case that the smart glasses are in the folded state, the first electrical connector (300) is exposed on the smart glasses; and in a case that the smart glasses are in the unfolded state, the first electrical connector (300) is covered by at least one of the glasses body (100) and the temples (200).

7 Claims, 7 Drawing Sheets

(58) Field of Classification Search
CPC .. G02C 11/10; G02C 5/22; G02C 5/14; A45C 11/04; H02J 7/0044; H02J 7/0045; H01R 13/74
See application file for complete search history.

(56)                       References Cited

U.S. PATENT DOCUMENTS

| | | | |
|---|---|---|---|
| 2017/0255029 A1* | 9/2017 | Klosinski, Jr. | ........... G02C 5/22 |
| 2018/0090958 A1* | 3/2018 | Steger | .................... A45C 11/04 |
| 2019/0086689 A1* | 3/2019 | Lin | ........................ G02C 5/146 |
| 2019/0137783 A1* | 5/2019 | Huang | ................... G02C 5/146 |
| 2020/0073148 A1* | 3/2020 | Alhaideri | ................ G02F 1/153 |
| 2021/0191159 A1* | 6/2021 | Rusconi Clerici Beltrami | ........... H02J 7/0045 |

FOREIGN PATENT DOCUMENTS

| | | |
|---|---|---|
| CN | 105559302 A | 5/2016 |
| CN | 205321530 U | 6/2016 |
| CN | 107589553 A | 1/2018 |
| CN | 107957627 A | 4/2018 |
| CN | 207992602 U | 10/2018 |
| CN | 110568628 A | 12/2019 |
| CN | 210248782 U | 4/2020 |
| JP | 2009-273261 A | 11/2009 |
| WO | 2018/143184 A1 | 8/2018 |
| WO | 2018/145085 A1 | 8/2018 |
| WO | 2019/094705 A1 | 5/2019 |

OTHER PUBLICATIONS

Japan Patent Office, Notice of Reasons for Refusal (Second Office Action) issued in corresponding Application No. JP 2022-567766 dated Apr. 2, 2024. (English language translation not readily available.).

China National Intellectual Property Administration, International Search Report issued in corresponding Application No. PCT/CN2021/092312, mailed Aug. 12, 2021.

European Patent Office, Extended European Search Report issued in corresponding Application No. EP 21803284 mailed Oct. 13, 2023.

Japan Patent Office, Office Action issued in corresponding Application No. 2022-567766 mailed Oct. 24, 2023. Translation not available.

* cited by examiner

SMART GLASSES, GLASSES CASE, AND GLASSES ASSEMBLY

CROSS-REFERENCE TO RELATED APPLICATIONS

The present disclosure is a continuation of International Application No. PCT/CN2021/092312, filed on May 8, 2021, which claims priority to Chinese Patent Application No. 202010396300.1, filed with the China National Intellectual Property Administration on May 11, 2020 and entitled "SMART GLASSES, GLASSES CASE, AND GLASSES ASSEMBLY", which is incorporated herein by reference in its entirety.

TECHNICAL FIELD

The present disclosure relates to the field of smart wearable device technologies, and in particular, to smart glasses, a glasses case, and a glasses assembly.

BACKGROUND

With rapid development of science and technology, an increasing number of new tech products have emerged in recent years, especially smart glasses, which are popular with a wide range of consumers.

Currently, an increasing number of functions are integrated in smart glasses, which leads to high power consumption of the smart glasses. In addition, due to a small size of the smart glasses, a battery disposed in the smart glasses is small in size, which leads to small battery capacity and short battery endurance of the smart glasses. Therefore, to make smart glasses have long battery endurance, conventional smart glasses usually need to be equipped with a glasses case, and the glasses case is provided with a battery so that the glasses case can charge the smart glasses. The glasses case usually charges the smart glasses in a wired manner. In such charging manner, a metal contact needs to be reserved on the smart glasses. The reserved metal contact destroys overall consistency of the smart glasses, making the smart glasses less attractive in appearance.

SUMMARY

According to a first aspect of the present disclosure, smart glasses are provided, which include a glasses body and temples, where the glasses body and the temples are rotatably connected, at least one of the glasses body and the temples is provided with a first electrical connector, and the smart glasses include a folded state and an unfolded state;
    in a case that the smart glasses are in the folded state, the first electrical connector is exposed on the smart glasses; and
    in a case that the smart glasses are in the unfolded state, the first electrical connector is covered by at least one of the glasses body and the temples.

According to a second aspect of the present disclosure, a glasses case for smart glasses is provided, where the glasses case is capable of accommodating the foregoing smart glasses, and the glasses case includes:
    a case body;
    a case cover, where the case cover is rotatably connected to the case body, the case cover and the case body form an accommodation space in a case that the case cover covers the case body, and at least one of the case body and the case cover is provided with a battery module; and
    a second electrical connector, where the second electrical connector is disposed on the case cover or the case body, and the second electrical connector is electrically connected to the battery module; and
    in a case that the smart glasses are located in the accommodation space, the second electrical connector is electrically connected to the first electrical connector.

According to a third aspect of the present disclosure, a glasses assembly is provided, which includes the foregoing smart glasses and the foregoing glasses case.

The technical solutions used in the present disclosure can achieve the following beneficial effects.

BRIEF DESCRIPTION OF DRAWINGS

To describe the technical solutions in the embodiments of the present disclosure or in the background more clearly, the following briefly describes the accompanying drawings required for describing the embodiments or the background. Apparently, a person of ordinary skill in the art may still derive other drawings from these accompanying drawings without creative efforts.

Figure 1:
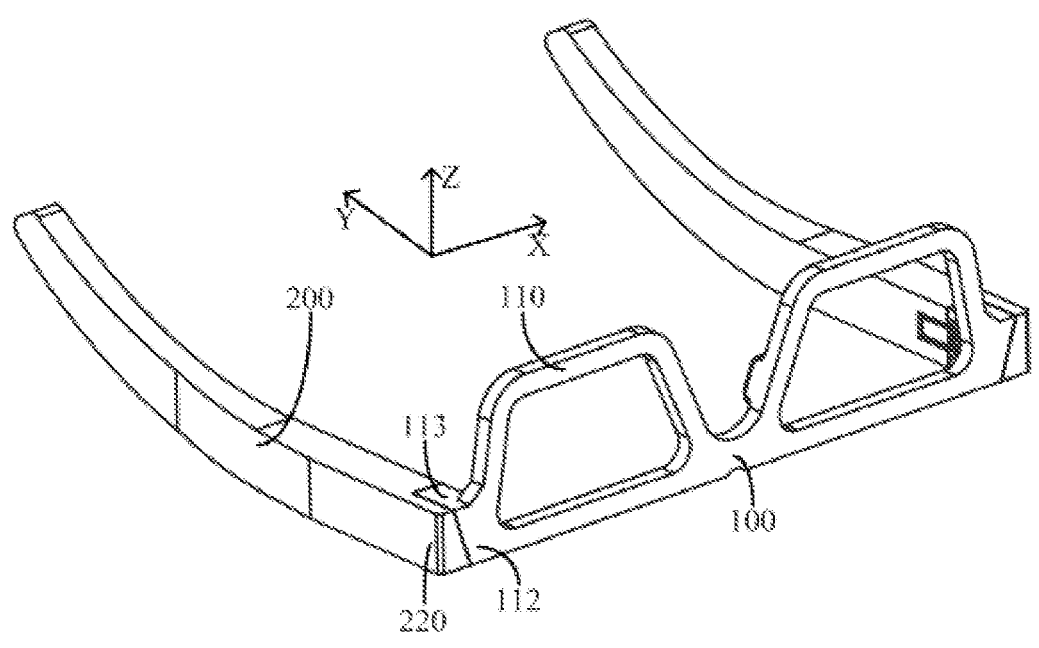
FIG. 1 is a schematic diagram of smart glasses according to a first embodiment of the present disclosure.
Figure 2:
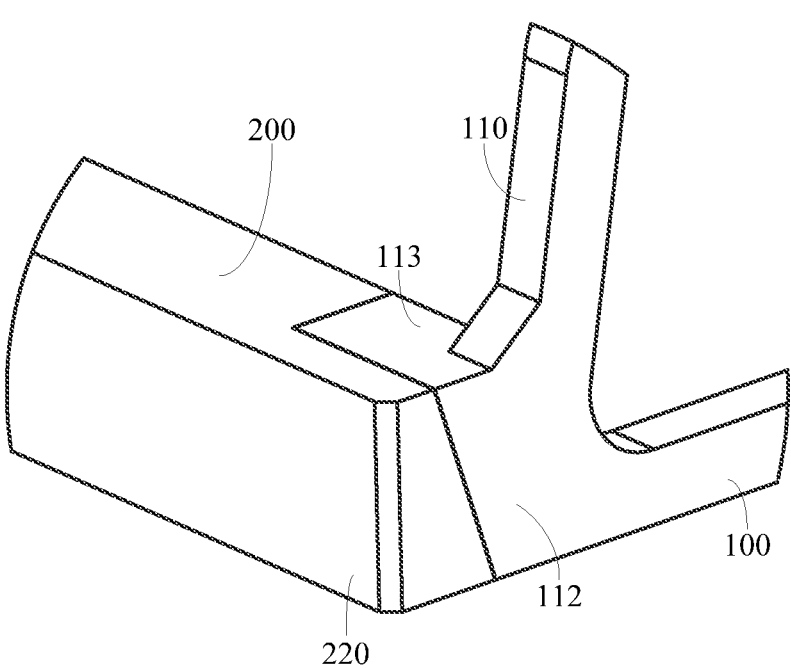
FIG. 2 is a schematic partial enlarged view of FIG. 1.
Figure 3:
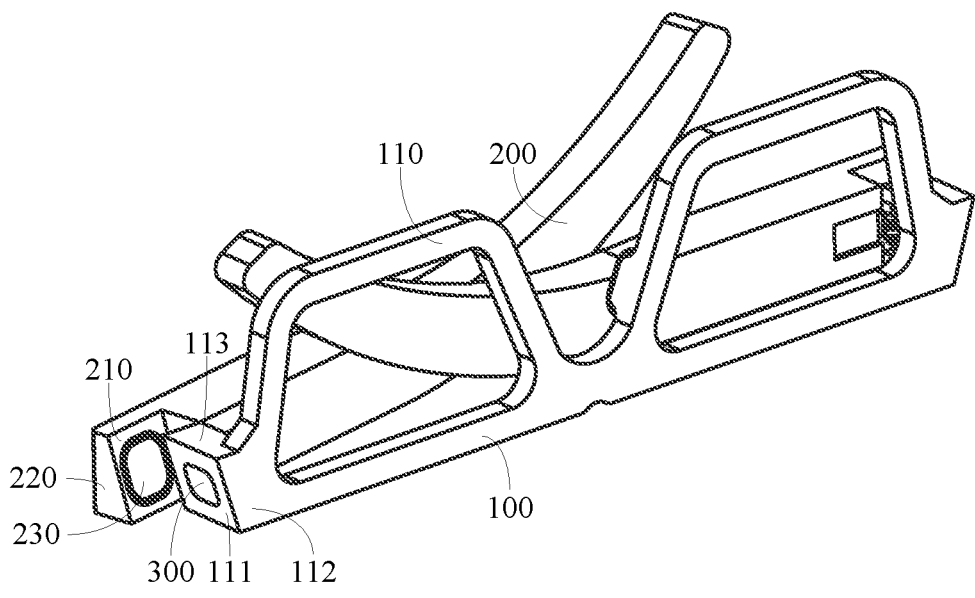
FIG. 3 is a schematic diagram of FIG. 1 in another state.
Figure 4:
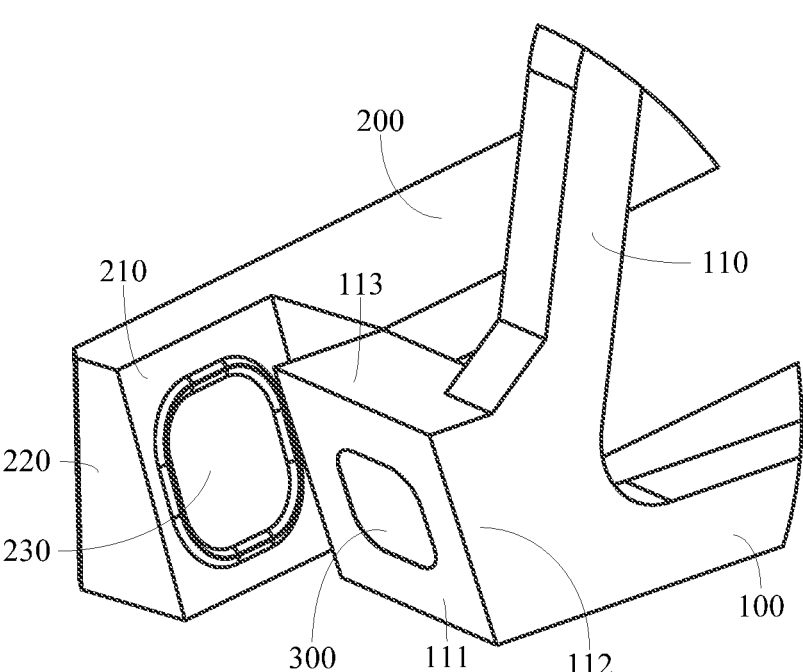
FIG. 4 is a schematic partial enlarged view of FIG. 3.
Figure 5:
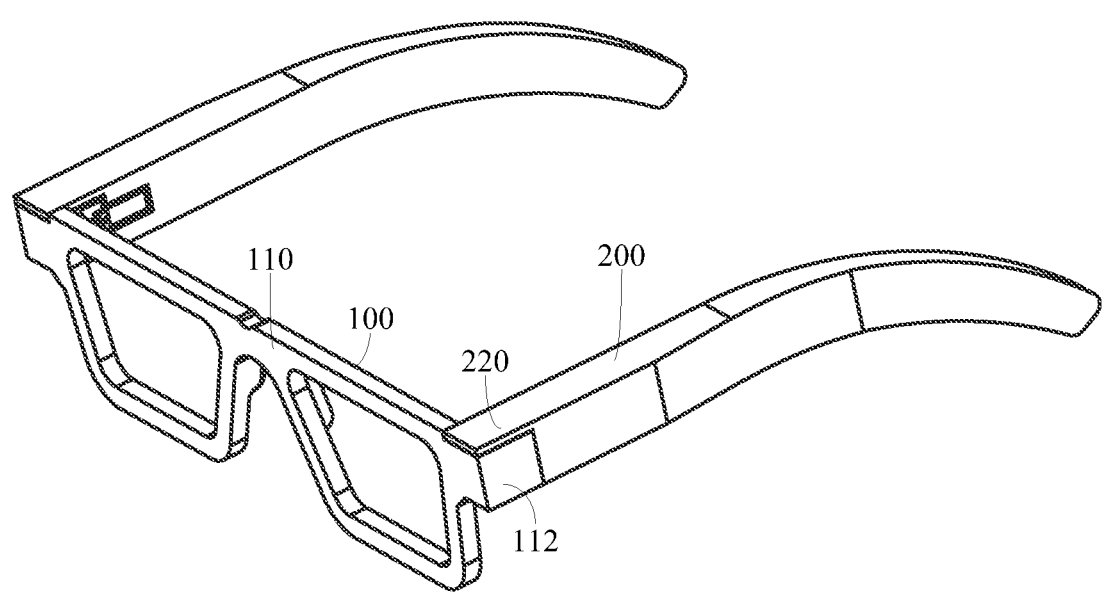
FIG. 5 is a schematic diagram of smart glasses according to a second embodiment of the present disclosure.
Figure 6:
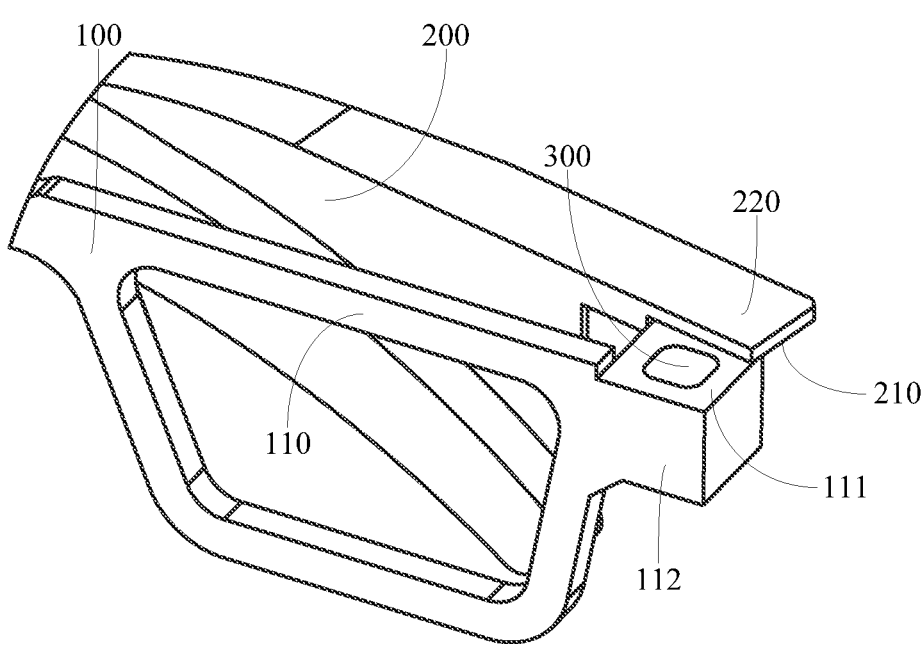
FIG. 6 is a schematic partial enlarged view of FIG. 5 in another state.
Figure 7:
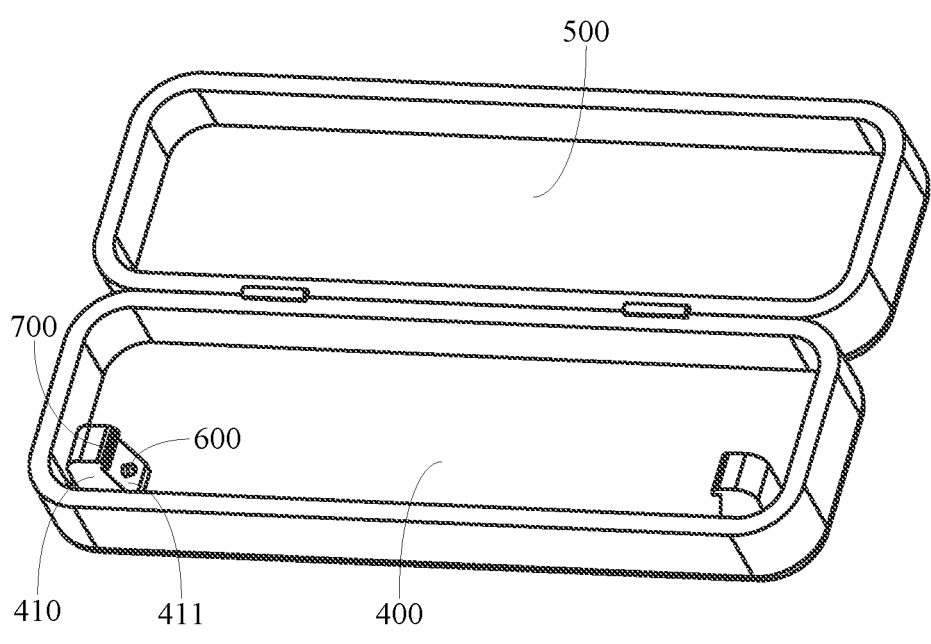
FIG. 7 is a schematic diagram of a glasses case according to a first embodiment of the present disclosure.
Figure 8:
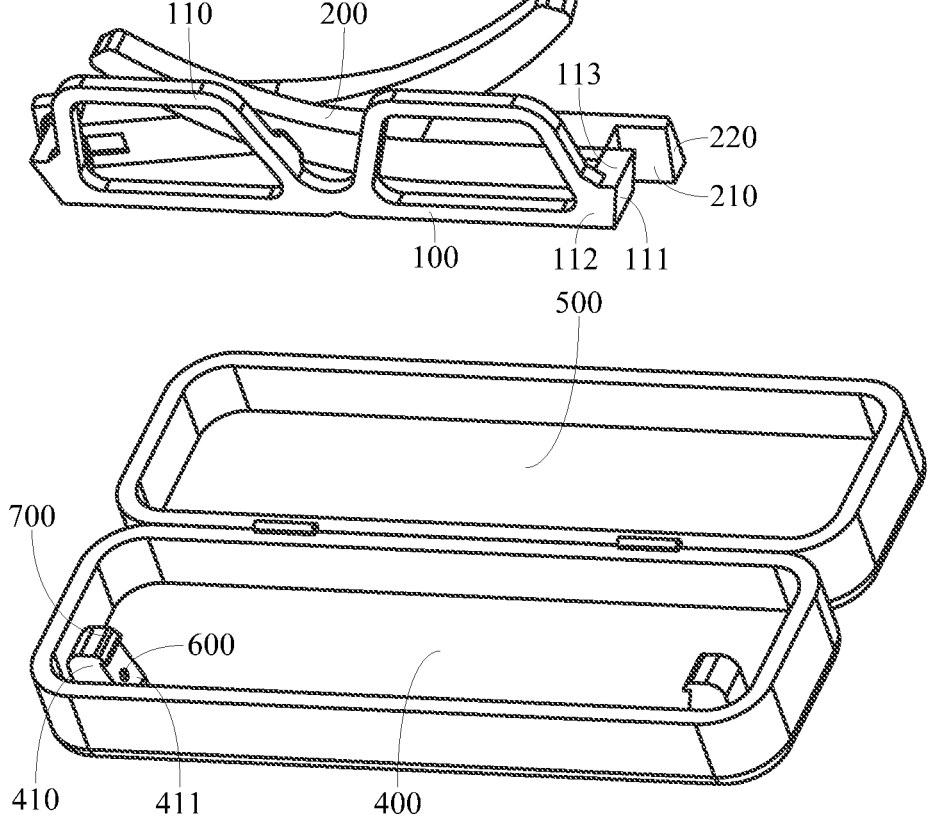
FIG. 8 is a schematic diagram of smart glasses being ready to be placed in a glasses case according to a first embodiment of the present disclosure.
Figure 9:
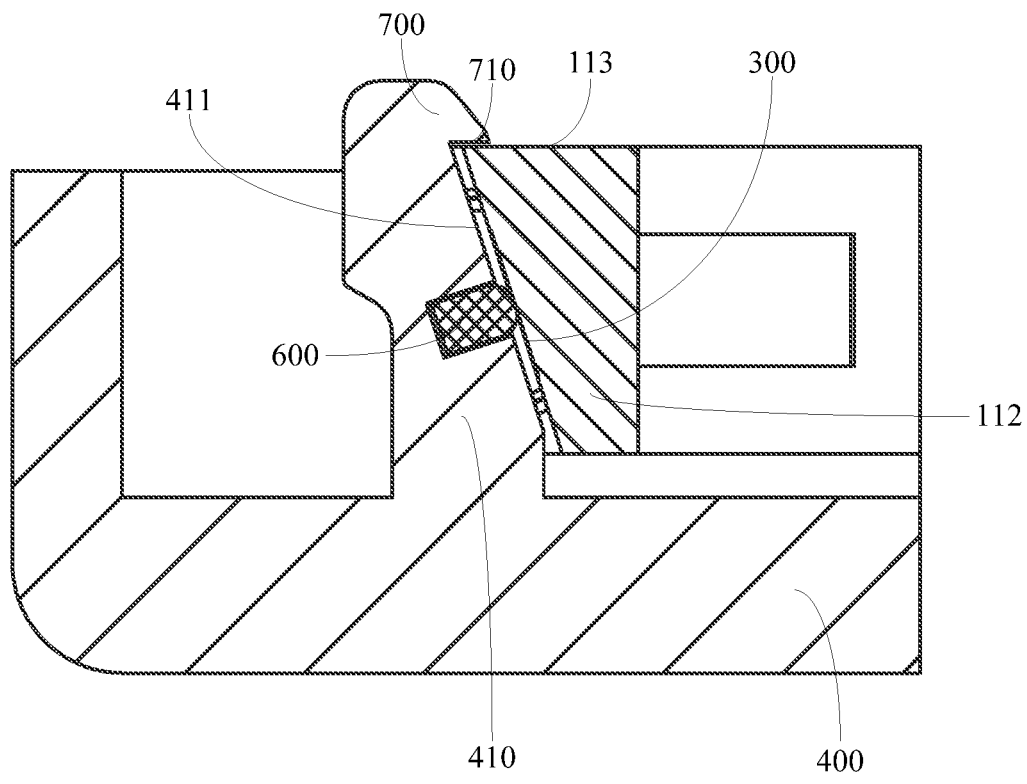
FIG. 9 is a sectional view of fitting when smart glasses are placed in a glasses case according to a first embodiment of the present disclosure.
Figure 10:
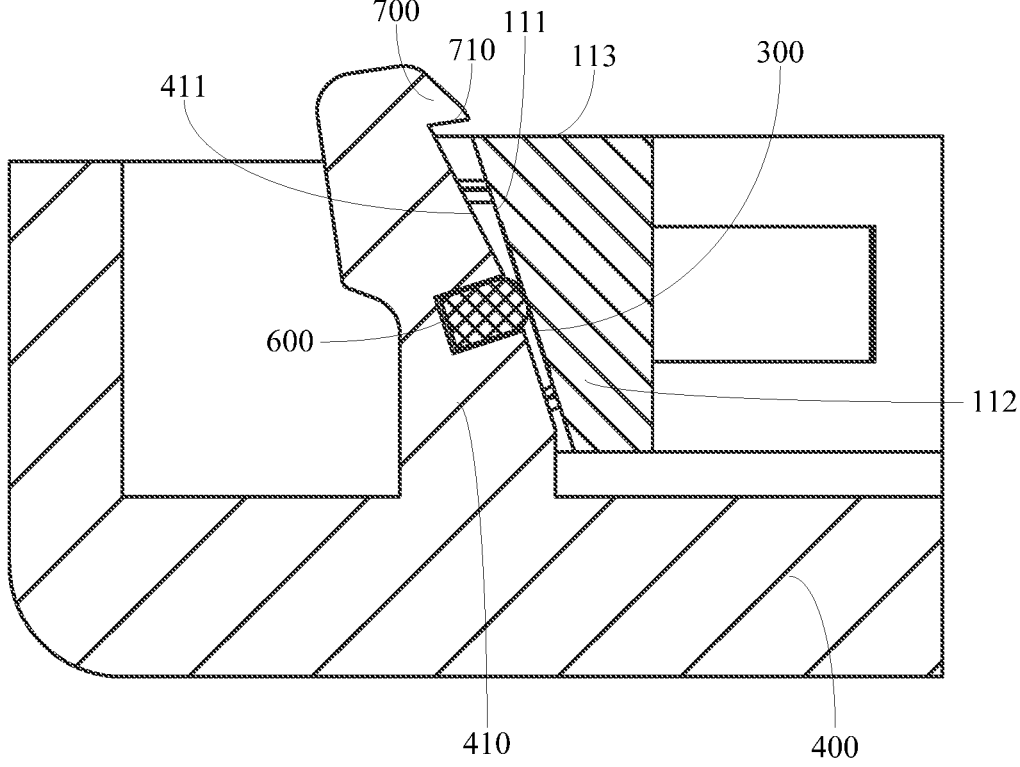
FIG. 10 is a sectional view of fitting when smart glasses are ready to be separated from the glasses case according to a first embodiment of the present disclosure.
Figure 11:
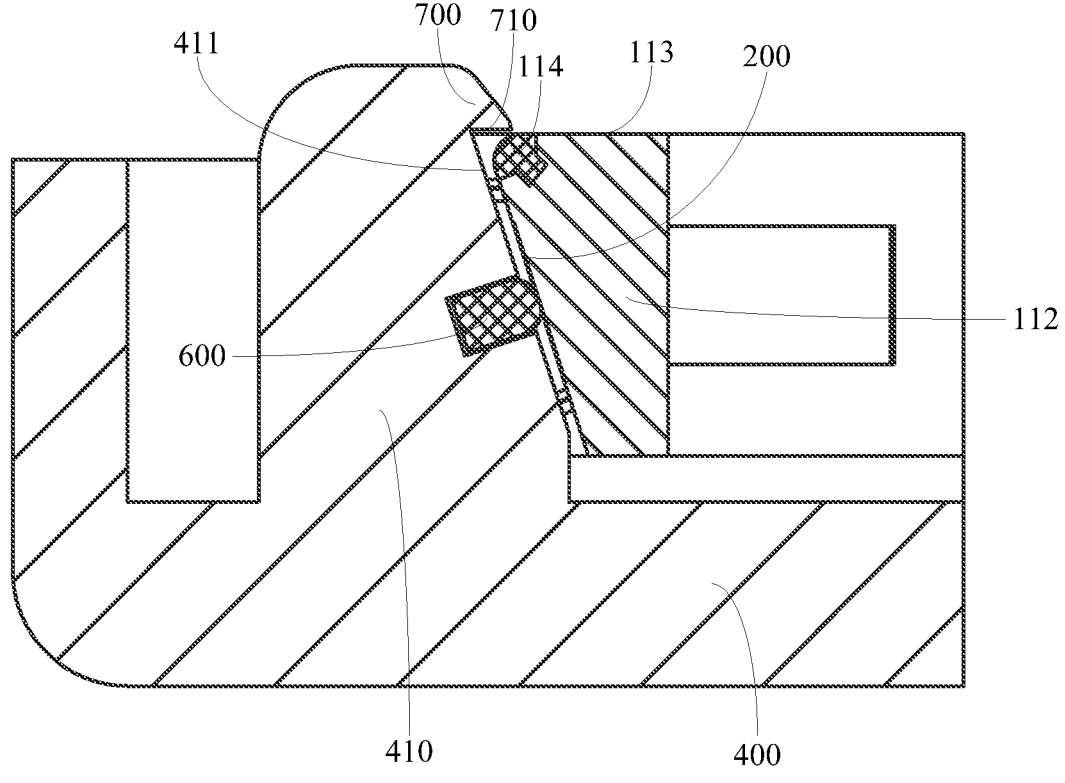
FIG. 11 is a sectional view of fitting when smart glasses are placed in a glasses case according to a second embodiment of the present disclosure.
Figure 12:
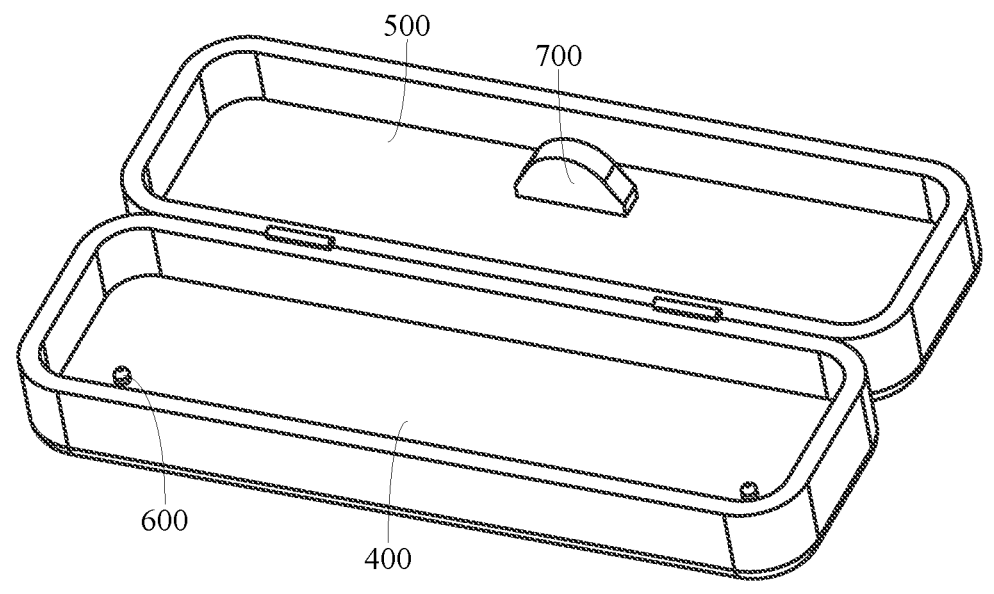
FIG. 12 is a schematic diagram of a glasses case according to a second embodiment of the present disclosure.
Figure 13:
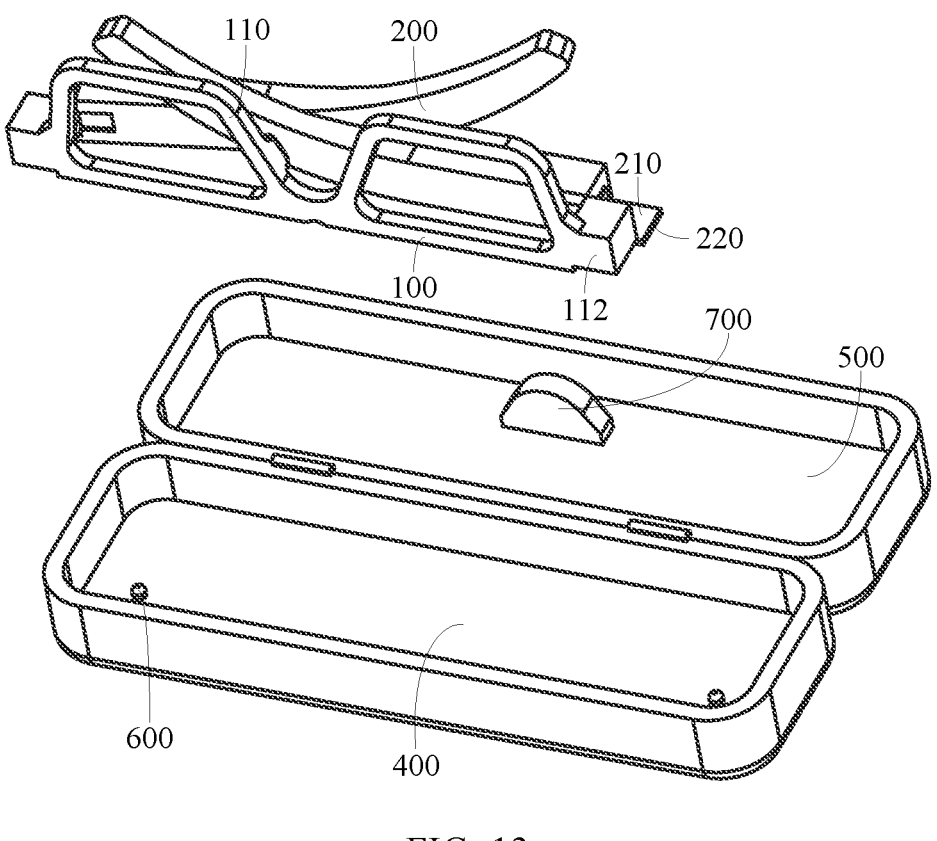
FIG. 13 is a schematic diagram of smart glasses being ready to be placed in a glasses case according to a second embodiment of the present disclosure.

Reference signs in the accompanying drawings are described as follows:
    100: glasses body, 110: bracket, 111: first fitting surface, 112: first extension part, 113: first positioning surface, 114: elastic part;
    200: temples, 210: second fitting surface, 220: second extension part, 230: elastic covering part;
    300: first electrical connector;
    400: case body, 410: protrusion part, 411: third fitting surface;

500: case cover;

600: second electrical connector;

700: positioning part, and 710: second positioning surface.

DESCRIPTION OF EMBODIMENTS

To make the objectives, technical solutions, and advantages of the present disclosure clearer, the following clearly describes the technical solutions of the present disclosure with reference to specific embodiments of the present disclosure and corresponding drawings. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The technical solutions disclosed in the embodiments of the present disclosure are described in detail below with reference to the accompanying drawings.

Referring to FIG. 1 to FIG. 13, an embodiment of the present disclosure discloses smart glasses. The disclosed smart glasses include a glasses body 100 and temples 200.

The glasses body 100 and the temples 200 are rotatably connected, at least one of the glasses body 100 and the temples 200 is provided with a first electrical connector 300, the first electrical connector 300 is electrically connected to a battery module of the smart glasses, and the smart glasses can be charged through the first electrical connector 300. Alternatively, the battery module of the smart glasses may be disposed in the glasses body 100, and in this case, the first electrical connector 300 is disposed on the glasses body 100; or the battery module may be disposed in the temples 200, and in this case, the first electrical connector 300 is disposed on the temples 200; or the glasses body 100 and the temples 200 each may be provided with the battery module, and in this case, the glasses body 100 and the temples 200 each may be provided with the first electrical connector 300. This is not limited in the embodiments of the present disclosure.

In this embodiment of the present disclosure, the smart glasses include a folded state and an unfolded state. In a case that the smart glasses are in the folded state, the first electrical connector 300 is exposed on the smart glasses. The smart glasses are usually in the folded state when not being worn by a user. In this case, the first electrical connector 300 is exposed on the smart glasses, and the smart glasses can be charged in a glasses case through the first electrical connector 300.

In a case that the smart glasses are in the unfolded state, the first electrical connector 300 is covered by at least one of the glasses body 100 and the temples 200. The smart glasses are usually in the unfolded state when being worn by a user. In this case, the smart glasses are usually not charged, and the first electrical connector 300 is not used. Therefore, the first electrical connector 300 is covered, so that the first electrical connector 300 is hidden, and the user cannot see the first electrical connector 300 from the outside of the smart glasses. In this way, the smart glasses look highly consistent, making the smart glasses look attractive.

In the smart glasses disclosed in this embodiment of the present disclosure, in a case that the smart glasses are in the folded state, the first electrical connector 300 is exposed on the smart glasses, and the user can charge the smart glasses through the first electrical connector 300. In a case that the smart glasses are in the unfolded state, the first electrical connector 300 is covered by at least one of the glasses body

100 and the temples 200, so that during user's normal use, the first electrical connector 300 is hidden, preventing the user from seeing the first electrical connector 300 from the outside of the smart glasses. In this way, when the user uses the smart glasses, the smart glasses look highly consistent and attractive, so that the smart glasses have good appearance consistency, ultimately improving user experience.

As described above, the first electrical connector 300 can be covered by at least one of the glasses body 100 and the temples 200. Alternatively, the glasses body 100 may include a bracket 110. The bracket 110 is rotatably connected to the temples 200, so that the smart glasses can switch between the unfolded state and the folded state through rotation. A connecting end of the bracket 110 connected to the temples 200 may have a first fitting surface 111, and an end of the temples 200 connected to the bracket 110 may have a second fitting surface 210. In a case that the smart glasses are in the unfolded state, the second fitting surface 210 faces the first fitting surface 111, and the second fitting surface 210 covers the first fitting surface 111, where at least one of the first fitting surface 111 and the second fitting surface 210 is provided with the first electrical connector 300. In this embodiment, the smart glasses can switch between the unfolded state and the folded state through rotation, so that the first electrical connector 300 can be hidden or exposed when the user switches a state of the smart glasses, thereby reducing user operations and improving ease of use of the smart glasses.

Optionally, the connecting end may be provided with a first extension part 112, the first fitting surface 111 is located on the first extension part 112, the end of the temples 200 connected to the bracket 110 may be provided with a second extension part 220, the second fitting surface 210 is located on the second extension part 220, and the second extension part 220 is capable of rotating relative to the first extension part 112. The first extension part 112 can provide an arrangement position for the first fitting surface 111, and the second extension part 220 can provide an arrangement position for the second fitting surface 210, thereby avoiding that there are insufficient positions on the bracket 110 and the temples 200 for arranging the first fitting surface 111 and the second fitting surface 210, and avoiding affecting layout of other components on the smart glasses. In this way, the first fitting surface 111 and the second fitting surface 210 can be arranged more conveniently, thereby simplifying layout of the smart glasses and reducing design difficulty for a designer.

Generally, the first extension part 112 has a plurality of surfaces, and the first fitting surface 111 may be provided on any one of the surfaces. For example, in a case that the user wears the smart glasses, the first fitting surface 111 may be provided on a surface of the first extension part 112 far away from the user. This is not limited in the embodiments of the present disclosure. Optionally, the first extension part 112 may include a first surface, a second surface, and a third surface connecting the first surface and the second surface, where the third surface may include the first fitting surface 111, and the first surface and the second surface are disposed facing away from each other. In a case that the smart glasses are in the unfolded state, the second extension part 220 covers the first fitting surface 111, and a surface of the second extension part 220 facing toward the first fitting surface 111 is the second fitting surface 210.

In this embodiment of the present disclosure, the first surface and the second surface are disposed facing away from each other in a height direction of the smart glasses. The smart glasses may further include a first optical module and a second optical module that are disposed on the bracket 110. Alternatively, the first optical module and the second optical module may be common spectacle lenses or displays. The first optical module and the second optical module are disposed in sequence along a first direction, and the third surface is an end face of the first extension part 112 facing toward the first direction. Still referring to FIG. 1, the first direction is a direction of an x-axis in FIG. 1, and the height direction of the smart glasses is a direction of a z-axis in FIG. 1.

In this solution, positions of the first fitting surface 111 and the second fitting surface 210 are specified. When the temples 200 rotate relative to the glasses body 100, the third surface can be well covered, so that the first fitting surface 111 can be well covered, and therefore the first electrical connector 300 disposed on the first fitting surface 111 can be well covered, allowing the first electrical connector 300 to be better hidden. In addition, this mode is simple and reliable, and facilitates arrangement.

In an optional embodiment, the temples 200 may include a temple body and a mounting ear that is bent and extends from the temple body to a second direction, the second surface faces toward the second direction, and the second surface includes a first positioning surface 113, the first positioning surface 113 capable of being in positioning fit with a second positioning surface 710 in the glasses case. When the smart glasses are accommodated in the glasses case, the first positioning surface 113 is in positioning fit with the second positioning surface 710 to prevent the smart glasses from shaking in the glasses case, preventing the smart glasses from being damaged due to bumping. In addition, the positioning fit between the first positioning surface 113 and the second positioning surface 710 also allows the smart glasses to be stably electrically connected to a second electrical connector 600 in the glasses case, thereby improving stability of the smart glasses during charging. It should be noted that, still as shown in FIG. 1, the second direction is the direction of the z-axis in FIG. 1.

To facilitate positioning fit between the smart glasses and the second positioning surface 710, in an optional embodiment, an elastic part 114 may be disposed at an intersection position of the first positioning surface 113 and the first fitting surface 111, the elastic part 114 capable of being in positioning fit with the second positioning surface. In a process of fitting between the smart glasses and the second positioning surface 710, the user may press the smart glasses to deform the elastic part 114, so as to implement positioning fit between the first positioning surface 113 and the second positioning surface 710. When the user needs to use the smart glasses, the user needs to apply only a small force to deform the elastic part 114 so as to relieve the positioning fit between the first positioning surface 113 and the second positioning surface 710. In this way, the user can easily take the smart glasses out of the glasses case for use, thereby improving user experience.

To further help the user take the smart glasses out of the glasses case for use, optionally, the first fitting surface 111 may be a first inclined surface, the temples 200 may include a temple body and a mounting ear that is bent and extends from the temple body to a second direction, the first inclined surface extends obliquely toward an extension direction of the first extension part 112 in the second direction, and the second fitting surface 210 may be a second inclined surface adapted to the first inclined surface. When positioning fit is required between the first positioning surface 113 and the second positioning surface 710, the first inclined surface can guide the smart glasses such that the smart glasses can move to a required position smoothly, easily implementing positioning between the first positioning surface 113 and the second positioning surface 710. In this way, the user can conveniently store the smart glasses in the glasses case and conveniently take the smart glasses out of the glasses case.

As described above, the first extension part 112 has a plurality of surfaces, and the first fitting surface 111 may be provided on any one of the surfaces. Optionally, the first extension part 112 may include a first surface and a second surface, and the first surface and the second surface are disposed facing away from each other. Alternatively, the first surface and the second surface are disposed facing away from each other in the height direction of the smart glasses. One of the first surface and the second surface may include the first fitting surface 111. In a case that the smart glasses are in the unfolded state, the second extension part 220 covers the first fitting surface 111, and a surface of the second extension part 220 facing toward the first fitting surface 111 is the second fitting surface 210. In this solution, another type of specific positions of the first fitting surface 111 and the second fitting surface 210 is provided. When the temples 200 rotate relative to the glasses body 100, the third surface can be well covered, so that the first fitting surface 111 can be well covered, and therefore the first electrical connector 300 disposed on the first fitting surface 111 can be well covered, allowing the first electrical connector 300 to be better hidden. In addition, this mode is simple and reliable, and facilitates arrangement.

The first surface and the second surface may each include the first fitting surface 111, so that there are two first electrical connectors 300. The two first electrical connectors 300 can speed up charging.

During use of the smart glasses, the first electrical connector 300 located on the first fitting surface 111 needs to be covered by the second fitting surface 210. In a process of covering the first electrical connector 300 with the second fitting surface 210, the second fitting surface 210 may touch the first electrical connector 300. Using the smart glasses for multiple times mean that the second fitting surface 210 may touch the first electrical connector 300 multiple times, and the first electrical connector 300 may fail due to the multiple times of collision. Based on this, in an optional embodiment, the first electrical connector 300 may be located on the first fitting surface 111, the second fitting surface 210 may be provided with an elastic covering part 230, and in a case that the smart glasses are in the unfolded state, the elastic covering part 230 covers the first electrical connector 300. When the second fitting surface 210 touches the first electrical connector 300, the elastic covering part 230 can serve as a buffer to reduce abrasion caused by the second fitting surface 210 to the first electrical connector 300, and prevent failure of the first electrical connector 300 caused by multiple times of collision, thereby extending a service life of the first electrical connector 300 and improving reliability of the smart glasses.

Alternatively, the elastic covering part 230 may be a silicone pad. The silicone pad is flexible, able to provide a good buffering function when the second fitting surface 210 touches the first electrical connector 300. In addition, the elastic covering part 230 can provide sealing protection for the first electrical connector 300 through deformation. The first electrical connector 300 may be a metal sheet. The metal sheet features simple structure, low cost, and easy arrangement on the smart glasses.

Based on the smart glasses disclosed in the embodiments of the present disclosure, an embodiment of the present disclosure further discloses a glasses case for smart glasses.

The disclosed glasses case is capable of accommodating the smart glasses described in any one of the foregoing embodiments. The disclosed glasses case includes a case body 400, a case cover 500, and a second electrical connector 600.

The case cover 500 is rotatably connected to the case body 400. Alternatively, the rotatable connection may be hinging. The case cover 500 and the case body 400 form an accommodation space in a case that the case cover 500 covers the case body 400, and at least one of the case body 400 and the case cover 500 is provided with a battery module. The second electrical connector 600 is disposed on the case cover 500 or the case body 400, and the second electrical connector 600 is electrically connected to the battery module. In a case that the smart glasses are located in the accommodation space, the second electrical connector 600 is electrically connected to the first electrical connector 300 to charge the smart glasses.

To improve stability of charging of the smart glasses in the glasses case, in an optional embodiment, the glasses case may further include a positioning part 700, where the positioning part 700 may be disposed on the case cover 500 or the case body 400. In a case that the smart glasses are located in the accommodation space, the positioning part 700 is in positioning fit with the smart glasses, and the first electrical connector 300 is electrically connected to the second electrical connector 600. When the smart glasses are accommodated in the glasses case, the positioning part 700 can limit displacement of the smart glasses to prevent the smart glasses from shaking in the glasses case and prevent the smart glasses from being damaged due to collision. Moreover, the positioning part 700 not only limits displacement of the smart glasses, but also allows the smart glasses to be stably electrically connected to the second electrical connector 600 located in the glasses case, thereby improving stability of the smart glasses during charging.

Alternatively, a protrusion part 410 may be disposed on the case body 400, the second electrical connector 600 is disposed on the protrusion part 410, an end of the protrusion part 410 facing away from the bottom of the case body 400 may be provided with the positioning part 700, the positioning part 700 may be a buckle, and the buckle may have a second positioning surface 710. In a case that the smart glasses are located in the accommodation space, the buckle snaps into the smart glasses, and the second positioning surface 710 faces at least part of the smart glasses, for example, may face the first positioning surface 113, so that the smart glasses are positioned in the glasses case. A buckle-based positioning structure is simple, and can be conveniently disposed on the glasses case. In addition, during use, the buckle-based positioning mode allows the user to conveniently take the smart glasses out of the glasses case or put the smart glasses back.

Further, the protrusion part 410 may have a third fitting surface 411. The third fitting surface 411 connects the second positioning surface 710 and the bottom of the case body 400. The second electrical connector 600 is disposed on the third fitting surface 411, and an included angle between a normal of the third fitting surface 411 and a bottom surface of the case body 400 may be an acute angle so that the third fitting surface 411 is inclined, and the third fitting surface 411 can adapt to a first inclined surface. The inclined third fitting surface 411 can well carry the smart glasses to some extent. Under the action of gravity of the smart glasses, the first electrical connector 300 can be in close contact with the second electrical connector 600, thereby improving reliability of electrical connection between the first electrical connector 300 and the second electrical connector 600.

Alternatively, the second electrical connector 600 may be a metal sheet. Optionally, the second electrical connector 600 may be an elastic electrical connector, for example, a spring plate or a pogo pin electrical connector. The elastic electrical connector can adapt to a distance between the first electrical connector 300 and the second electrical connector 600, so that the first electrical connector 300 and the second electrical connector 600 can be in close contact.

The positioning part 700 may be disposed on the case cover 500. When the smart glasses are located in the glasses case, the positioning part 700 may be in positioning fit with nose pads of the smart glasses. The second electrical connector 600 may be disposed on the case body 400, and the positioning part 700 presses the smart glasses against the case body 400 through the nose pads, so that the first electrical connector 300 is in close contact with the second electrical connector 600, thereby improving reliability of electrical connection.

Based on the smart glasses and the glasses case disclosed in the embodiments of the present disclosure, an embodiment of the present disclosure further discloses a glasses assembly, and the disclosed glasses assembly includes the smart glasses described in any one of the foregoing embodiments and the glasses case described in any one of the foregoing embodiments.

The foregoing embodiments of the present disclosure mainly describe the differences between the embodiments. Different optimization features of the embodiments can be combined to form more preferable embodiments provided that they are not contradictory. For brevity of description, details are not described herein.

The foregoing descriptions are merely embodiments of the present disclosure, but are not intended to limit the present disclosure. For a person skilled in the art, the present disclosure may have various changes and variations. Any modification, equivalent replacement, or improvement made within the spirit and principle of the present disclosure shall fall within the protection scope of the claims of the present disclosure.

What is claimed is:

1. A glasses assembly, comprising:
smart glasses; and
a glasses case for smart glasses,
wherein the smart glasses comprise:
a glasses body and temples, wherein the glasses body and the temples are rotatably connected, at least one of the glasses body or the temples is provided with a first electrical connector, and the smart glasses comprise a folded state and an unfolded state;
in a case that the smart glasses are in the folded state, the first electrical connector is exposed on the smart glasses; and
in a case that the smart glasses are in the unfolded state, the first electrical connector is covered by at least one of the glasses body or the temples,
wherein the glasses case for smart glasses comprises:
a case body;
a case cover, wherein the case cover is rotatably connected to the case body, the case cover and the case body form an accommodation space in a case that the case cover covers the case body, and at least one of the case body 400) or the case cover is provided with a battery module; and a second electrical connector, wherein the second electrical connector is disposed on the case cover or the case body, and the second electrical connector is electrically connected to the battery module; and in a case that the smart glasses are located in the accommodation space, the second electrical connector is electrically connected to the first electrical connector;

a connecting end of the glasses body connected to the temples is provided with a first extension part, the first extension part is provided with an elastic part capable of being in positioning fit with a second positioning surface of the glasses case.

2. The glasses assembly according to claim 1, wherein the glasses body comprises a bracket, wherein the bracket is rotatably connected to the temples, a connecting end of the bracket connected to the temples has a first fitting surface, and an end of the temples connected to the bracket has a second fitting surface; and in a case that the smart glasses are in the unfolded state, the second fitting surface faces the first fitting surface, and the second fitting surface covers the first fitting surface, wherein at least one of the first fitting surface or the second fitting surface is provided with the first electrical connector.

3. The glasses assembly according to claim 2, wherein the first fitting surface is located on the first extension part, the end of the temples connected to the bracket is provided with a second extension part, the second fitting surface is located on the second extension part, and the second extension part is capable of rotating relative to the first extension part.

4. The glasses assembly according to claim 3, wherein the first extension part comprises a first surface, a second surface, and a third surface connecting the first surface and the second surface, wherein the third surface comprises the first fitting surface, and the first surface and the second surface are disposed facing away from each other; and in a case that the smart glasses are in the unfolded state, the second extension part covers the first fitting surface, and a surface of the second extension part facing toward the first fitting surface is the second fitting surface.

5. The glasses assembly according to claim 4, wherein the temples comprise a temple body and a mounting ear that is bent and extends from the temple body to a second direction, wherein the second surface faces toward the second direction, and the second surface comprises a first positioning surface, the first positioning surface capable of being in positioning fit with a second positioning surface in a glasses case.

6. The glasses assembly according to claim 5, wherein the elastic part is disposed at an intersection position of the first positioning surface and the first fitting surface.

7. The smart glasses according to claim 4, wherein the first fitting surface is a first inclined surface, the temples comprise a temple body and a mounting ear that is bent and extends from the temple body to a second direction, the first inclined surface extends obliquely toward an extension direction of the first extension part in the second direction, and the second fitting surface is a second inclined surface adapted to the first inclined surface.

* * * * *